Oct. 2, 1923.
V. MAUCK
1,469,565
SHELL FORMING MECHANISM
Filed May 18, 1921    6 Sheets-Sheet 1
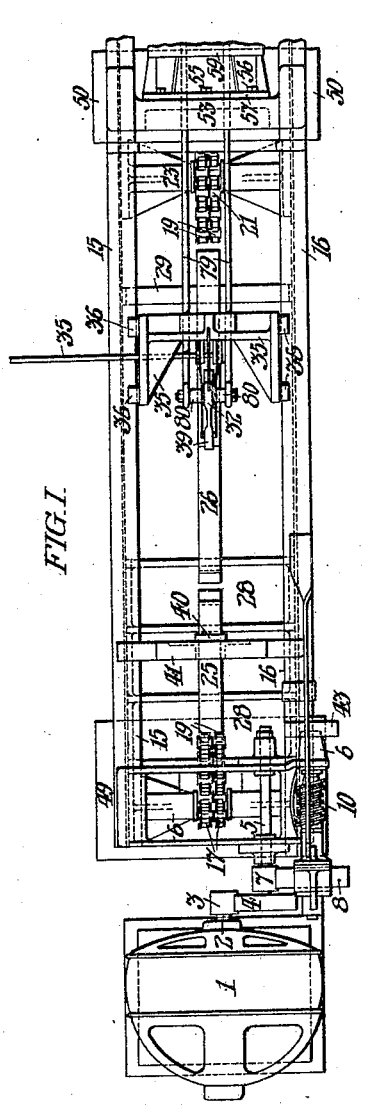
FIG. I.
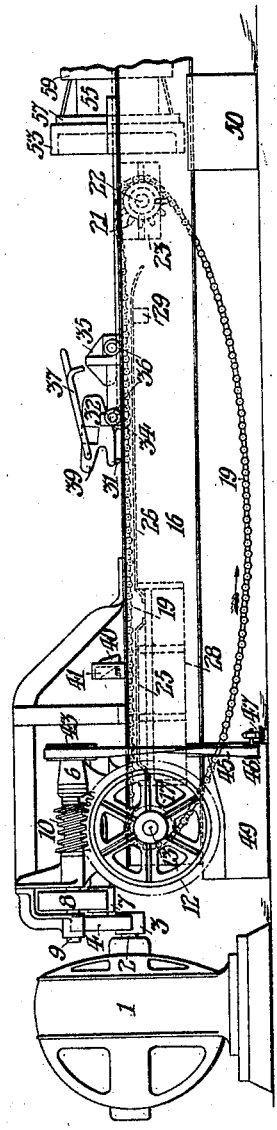
FIG. II.
INVENTOR:
VICTOR MAUCK, Oct. 2, 1923.
V. MAUCK
SHELL FORMING MECHANISM
Filed May 18, 1921
1,469,565
6 Sheets-Sheet 2
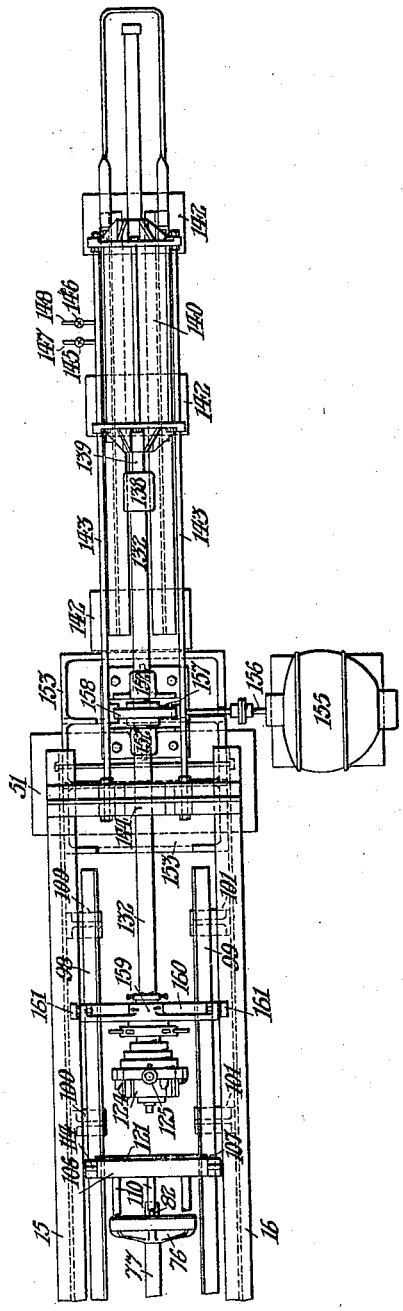
FIG. III.
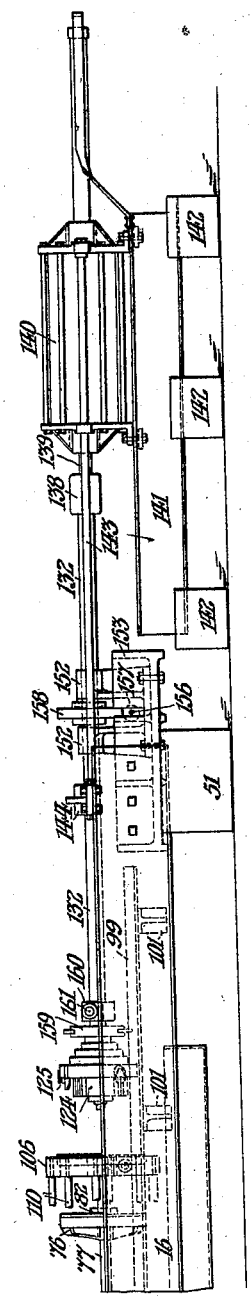
FIG. IV.
INVENTOR:
VICTOR MAUCK,

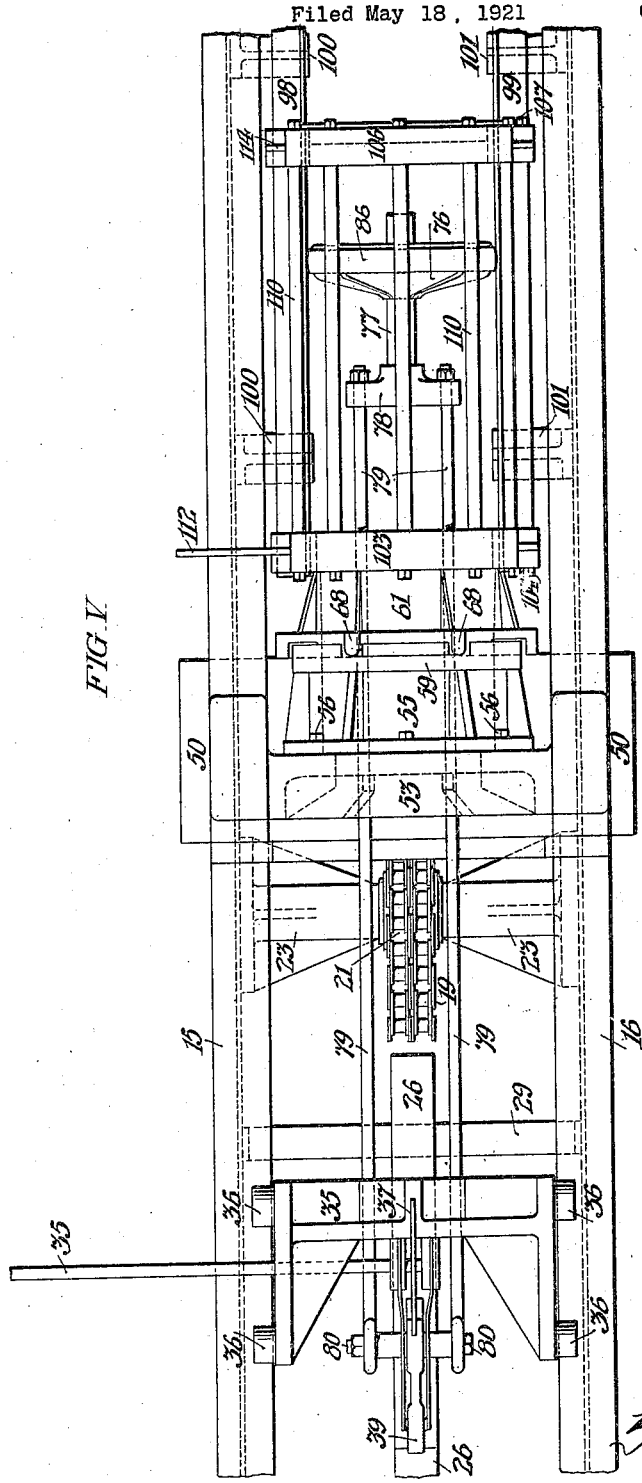

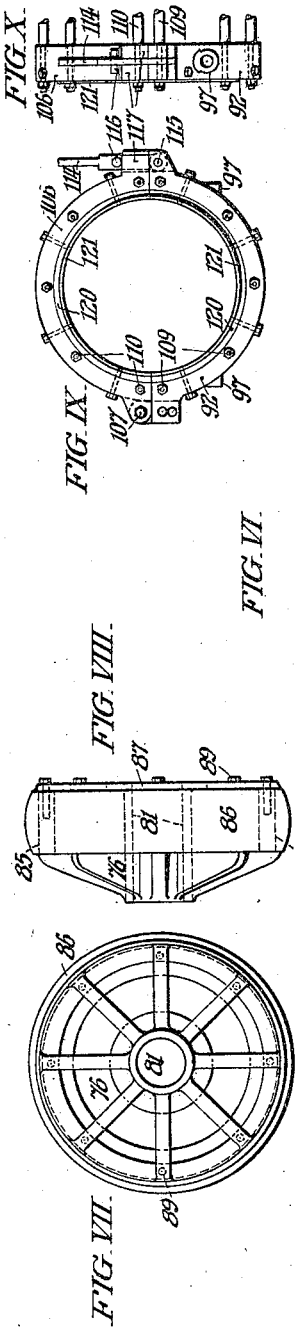

Oct. 2, 1923.
V. MAUCK
1,469,565
SHELL FORMING MECHANISM
Filed May 18, 1921   6 Sheets-Sheet 5
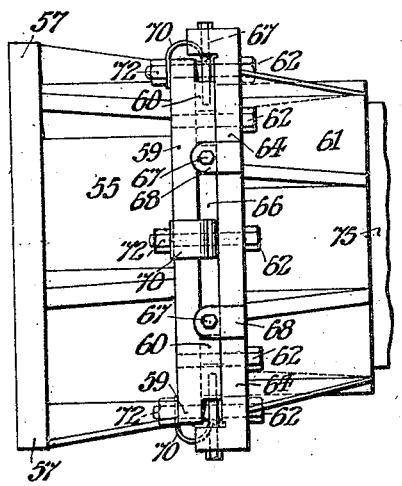
FIG. XI.
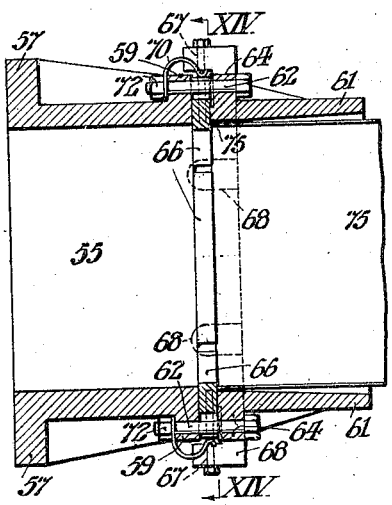
FIG. XII.
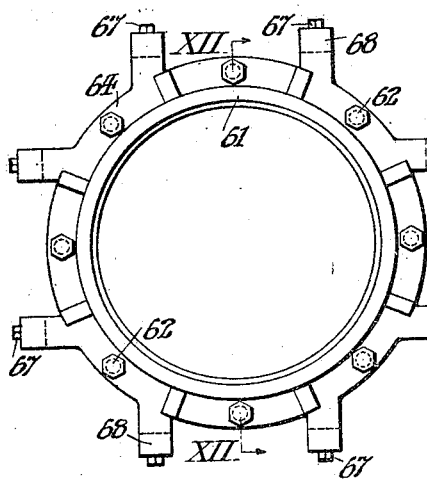
FIG. XIII.
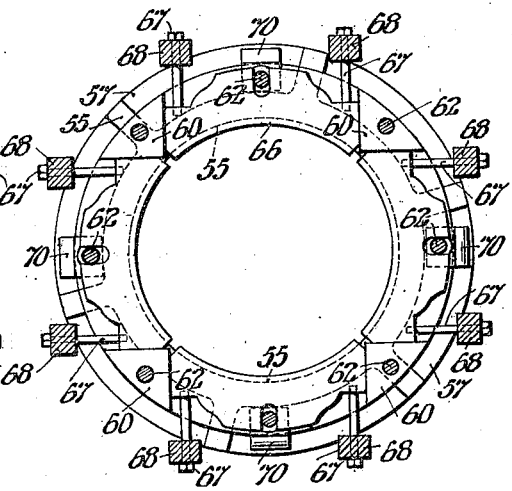
FIG. XIV.
INVENTOR:
VICTOR MAUCK,

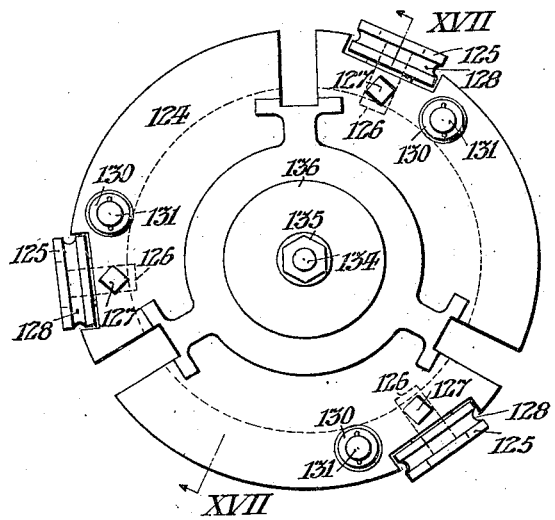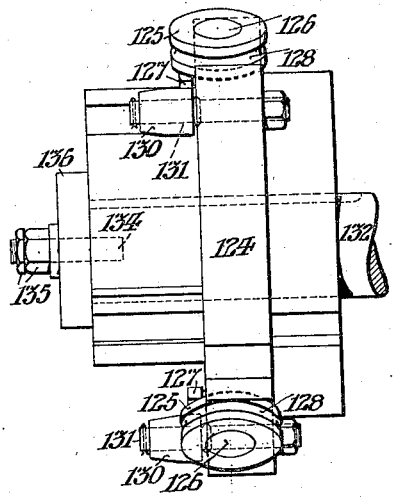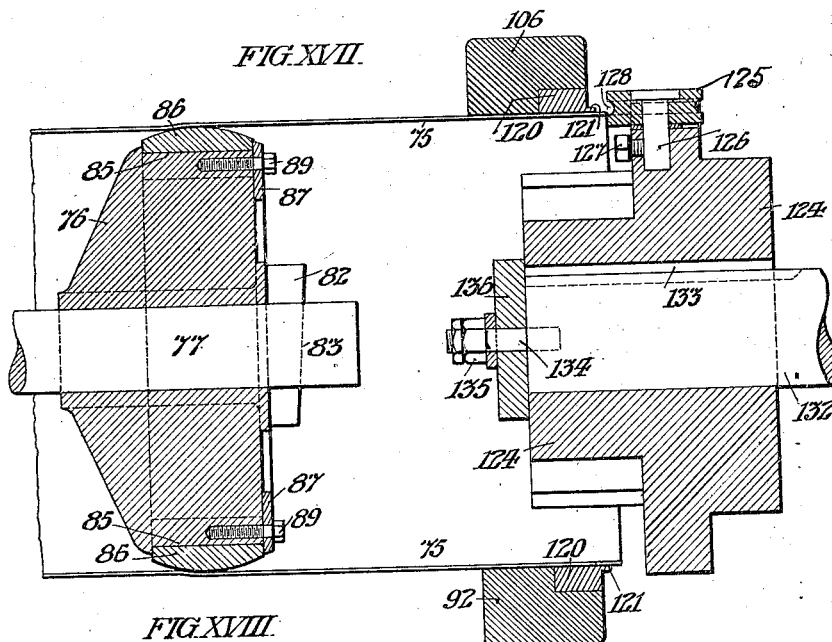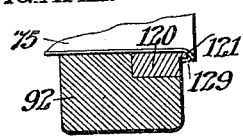

Patented Oct. 2, 1923.

1,469,565

UNITED STATES PATENT OFFICE.

VICTOR MAUCK, OF NORRISTOWN, PENNSYLVANIA.

SHELL-FORMING MECHANISM.

Application filed May 18, 1921. Serial No. 470,673.

*To all whom it may concern:*

Be it known that I, VICTOR MAUCK, a citizen of the United States, residing at Norristown, in the county of Montgomery and State of Pennsylvania, have invented a certain new and useful Improvement in Shell-Forming Mechanism, whereof the following is a specification, reference being had to the accompanying drawings.

My invention relates to mechanism adapted to shape cylindrical tubular metal shells such as form the bodies of munition casings or canisters. An object and effect of my invention is to provide means for expanding such shells to precisely uniform diameter throughout their length while contemporaneously spinning one end thereof to form a toric flange therefrom to reinforce each shell and afford a seat for a closure The form of my invention hereinafter described is adapted for operation upon cylindrical tubular shell blanks, each previously formed of primarily plane sheet metal by rolling the latter to cylindrical form and butt welding edges thereof extending longitudinally in the shell. Such blanks are more or less distorted from true cylindrical form by the heat of the welding operation; so that it is necessary to thereafter reshape them to the true cylindrical form and uniform diameter required by United States Government specifications.

As hereinafter described; my invention includes mechanism whereby such shell blanks are successively held in stationary position while a circular die, slightly larger than the internal diameter of said blanks, and resembling a piston head, is drawn longitudinally through them, with the effect of not only expanding them to the desired diameter, but rendering them straight throughout their length. Said die is detachably connected with a plunger arranged to reciprocate axially with respect to said blanks; so that said die is only passed through the blanks in one direction; being removed from said plunger while the latter is returned to its initial position. The metal of said shells is so thin, in comparison with the diameter thereof, that it has been found extremely difficult to prevent distortion thereof by either of the operations herein contemplated; for if the metal remains under compression during the passage of said die through said blanks, the latter tend to crimp and collapse axially, and such shells tend to deform torsionally, during formation of a torical flange thereon. Therefore, an important feature of my invention is such construction and arrangement of the mechanism that said two operations are cooperatively effected; so that the stresses produced by each assist the other. For instance, in accordance with my invention, each shell blank is frictionally held by said die in its passage therethrough, so that torsional movement or distortion of said shell is prevented while it is being subjected to the torsional stresses incident to expanding and spinning such a flange upon the open end of the shell.

As hereinafter described, such expanding and spinning formation of the torical flanges of such shells is effected by a rotary spinning head including a circumferential series of forming rollers which are pressed upon the end of the shell, in the direction of the length of the latter, while said head is being rotated upon an axis common to said shell and to said die. A further cooperative effect of the form of my invention hereinafter described is that the initial spinning operation of said head turns the end of the shell over a stationary anchoring ring, which opposes the spinning rollers, and thus anchors said shell at that end which is being thus spun so that the entire shell is held under tension between that end and said die while the latter is drawn through the shell. The effect of such cooperation is that each shell blank is thus relieved of the stresses which would be produced therein by the operation of said die and said spinning head separately, independently; such stresses of each of said devices being neutralized by the other. However, it is to be understood that each of said die mechanisms and flange forming mechanisms is complete in itself and may be employed independently of the other; of course, without the advantageous cooperative effect above contemplated.

My invention includes the various novel features of construction and arrangement hereinafter more definitely specified.

In said drawings; Fig. I is a plan view of the left hand portion (approximately one-half) of a machine embodying my invention and showing the means for drawing said die through the shells.

Fig. II is a front elevation of the portion of said machine shown in Fig. I.

Fig. III is a plan view of the right hand portion of said machine showing the rotary spinning head and the means for forcing it toward said shells.

Fig. IV is a front elevation of the portion of said machine shown in Fig. III, except the motor which is at the lower part of Fig. III.

Fig. V is a fragmentary plan view, on a larger scale than Figs. I and III, showing the intermediate portion of said machine.

Fig. VI is a front elevation of the portion of said machine shown in Fig. V.

Fig. VII is an end view of the circular die aforesaid; being the forward end thereof, with reference to its passage through said shells.

Fig. VIII is a side elevation of said die.

Fig. IX is a right hand end elevation of the cradle in which said shell blanks are held in said machine and which holds the anchor ring aforesaid.

Fig. X is a fragmentary rear elevation of the portion of said cradle shown in Fig. IX.

Fig. XI is a front elevation of the cylindrical tubular abutment frame of said machine in which said shells are supported against axial displacement during the operations aforesaid.

Fig. XII is a central longitudinal sectional view of said abutment frame, taken on the line XII, XII in Fig. XIII, but with a fragment of a shell blank abutting therein.

Fig. XIII is a right hand end elevation of said frame shown in Figs. XI and XII.

Fig. XIV is a transverse sectional view of said frame, taken on the line XIV, XIV in Fig. XII; showing the construction and arrangement of the radially adjustable shell abutment blocks.

Fig. XV is a left hand end elevation of the spinning head.

Fig. XVI is a front side elevation of said spinning head.

Fig. XVII is a longitudinal sectional view of a portion of a shell blank with said die, spinning head and anchor ring in cooperative relation therewith.

Fig. XVIII is a fragmentary sectional view of said shell, similar to Fig. XVII, but showing the initial deformation thereof over said anchor ring, effected by the advance of said spinning head to the left in Fig. XVII.

I find it convenient to actuate the mechanism for drawing said die through the shells, by means of the electric motor indicated at 1 in Figs. I and II. The armature shaft 2 of said motor has the gear 3 engaging the gear 4 on the countershaft 5 which is journaled in the housing 6 and provided with the gear 7 engaging the gear 8 on the worm shaft 9, also journaled in said housing, and provided with the worm 10 engaging the worm gear 12 on the chain driving shaft 13. Said shaft 13, also journaled in said housing 6, carries, intermediate of the parallel frame girders 15 and 16, a sprocket wheel 17 which engages the double sprocket chain 19. Said chain is endless and extends from said sprocket wheel 17 around the sprocket wheel 21 on the idler shaft 22 which is journaled in the housing 23 which extends transversely between said girders 15 and 16. Said chain is progressed in the direction of the arrow shown in Fig. II and, although the upper reach thereof is drawn substantially straight by the tensile strain thereon; I prefer to provide guide plates 25 and 26 to insure that the upper reach of said chain shall not sag from the position in which it is desired to operate. The upper reach of said chain is broken away in Fig. I to show said guides. Said guide 25 is supported by the cross frame 28 which extends between said girders 15 and 16, and said guide 26 is supported at one end by said frame 28 and at the other end by the cross bar 29 which extends between said girders.

Said chain 19 is thus supported in position to be detachably engaged by the hooks 31 carried by the hook frame 32 which is pivoted at 34 on the carriage 35. Said carriage 35 is supported by four wheels 36 arranged to roll upon the top flanges of said girders 15 and 16 which thus serve as tracks for said carriage 35. Said hook frame 32 is provided with the handle 37 by which it may be raised to the idle position shown, or lowered to engage said hooks 31 between the successive links of said chain 19. Said hook frame 32 has the cam 39 projecting above and beyond said hooks 31 and adapted to encounter the stationary cam 40 on the cross bar 41 which is rigidly connected with said girders 15 and 16 so as to automatically raise said hook frame 32 and disengage said hooks 31 from said chain and thus limit the traverse of said hook frame 32 and carriage 35 toward the left in Figs. I and II.

I find it convenient to provide said shaft 9 with the pulley 43 connected by the belt 45 with the pulley 46 of the oil pump 47 to lubricate the mechanism above described through pipes leading from said pump but which are omitted from the drawing.

I find it convenient to support said girders 15 and 16 upon three foundation piers respectively 49, 50 and 51; the first two being shown in Figs. I and II, and the pier 51 being shown in Figs. III and IV. As shown in Figs. V and VI; said girders 15 and 16 are connected by the bridge frame 53 over said foundation 50 to support the abutment frame 55. Said frame 55 has a cylindrical tubular body and is rigidly connected with said bridge frame 53 by bolts 56 extending through the annular flange 57 on said frame 55.

As shown in Figs. XI to XIV inclusive; said abutment frame 55 has, at its end opposite to its flange 57, the annular flange 59 with spacing lugs 60, and supports the throat frame 61 which has a conical tubular body, in coaxial relation with the cylindrical body of said abutment frame 55 and rigidly connected in spaced relation therewith by the eight bolts 62 which extend through the annular flange 64 on said throat frame 61, into engagement with said flange 59 on said abutment frame 55 in the circumferential relation best shown in Figs. XIII and XIV.

As shown in Figs. XII and XIV; I provide four similar arcual abutment blocks 66 which are disposed in a circumferential series and respectively mounted to reciprocate radially with respect to the common axis of said frames 55 and 61 between said flanges 59 and 64, and are guided by said spacing lugs 60. When in their normal inner position, shown in Fig. XIV, the inner arcual edges of said blocks are in concentric relation with said axis, and each of said blocks 66 is provided with a pair of bolts 67 to limit its inward movement; said bolts 67 being fitted to reciprocate through brackets 68 projecting from said flange 64 on the throat frame 61, as best shown in Fig. XIII. Said blocks 66 are yieldingly presented in the position shown by their respective leaf springs 70 which are held on four of said bolts 62 by nuts 72, as best shown in Fig. XII; which also shows the left hand end of the shell blank 75 abutting against said abutment blocks 66 so as to support said shell against movement to the left when the die 76 is drawn therethrough in that direction. Said die 76 is carried by the plunger 77 which, as shown in Fig. V, is provided with the cross head 78 connected by a pair of parallel tension rods 79 with trunnions 80 on said carriage 35 so as to be drawn to the left whenever said hooks 31 are engaged with said chain 19 as above described, and the yielding arrangement of said abutment blocks 66 above described is designed to permit said die 76 to be drawn entirely through said blank 75; said blocks being automatically thrust outwardly, against the pressure of their respective springs 70 only when encountered by said die at the extreme left end of its range of movement.

As shown in Figs. VII, VIII and XVII, said die 76 is constructed and arranged like a piston head, the body portion thereof being a single casting having an axial bore 81 fitted to said plunger 77 upon which said body is detachably secured by the wedge 82 which may be manually inserted and removed with respect to the slot 83 in said plunger. I also provide said body with the peripheral seat 85 for the hardened steel ring 86 which is held in said seat by the annular plate 87 connected with said body by the bolts 89. As best shown in Fig. XVII; the outer wearing surface of said hardened steel ring 86 of said die 76 is convexly curved to facilitate its passage through said blank 75 which is expanded thereby. However, the extent of such expansion is not proportionately as great as indicated in Fig. XVII, which is exaggerated for the purpose of illustration.

In order to facilitate the introduction of successive shell blanks 75 into said throat frame 61 and to also secure the right hand ends of said blanks in position to properly receive said die 76; I provide the cradle shown in Figs. V, VI, IX and X. Said cradle comprises two split ring frames having respective semicircular bed members 91 and 92 at the left and right hand ends thereof, rigidly connected with said girders 15 and 16 by bolts 93 and 94 (indicated in Fig. VI); conveniently in concentric relation with respective bosses 96 and 97 projecting from said frame members 91 and 92 and resting upon the rails 98 and 99 which extend parallel with and respectively adjacent to said girders 15 and 16 and are rigidly connected therewith by the respective brackets 100 and 101. The semicircular swing frame member 103, which is complementary to said stationary frame member 91 is hingedly connected with the latter by the bolt 104, shown in Fig. VI. The semicircular swing frame member 106, which is complementary to said stationary frame member 92 is hingedly connected therewith by the bolt 107 shown in Figs. VI and IX. Said stationary cradle frame members 91 and 92 are rigidly connected by the five spacing bars 109, and said swing cradle frames 103 and 106 are rigidly connected by the five similar spacing bars 110; said bars 109 and 110 forming a circumferential series in concentric relation with the axis of the cradle, as best indicated in Fig. IX. Said swing frame 103 is provided with the handle 112, shown in Fig. V, whereby the upper half of the cradle comprising said two swing frames 103 and 106 and the spacing bars 110 connecting them may be swung open on the respective, axially alined, hinge bolts 104 and 107 to admit successive shell blanks 75 to the position indicated in Figs. XII and XVII and to permit the removal of said blanks. However, in order to prevent accidental displacement of the swing portion of said cradle by the stresses to which it is subjected by the operations of expanding and spinning said shell 75 therein; I not only support said cradle frames 91 and 103 against the right hand annular edge of the throat frame 61, as indicated in Figs. V and VI, but clamp the swing frame 106 in closed position upon its complementary stationary frame 92, as indicated in Figs. IX and X. As shown in Fig. IX; the clamping lever 114 is pivoted at 115 in the stationary cradle frame 92 and provided with the cross pin 116 which rides upon the bifurcated lug 117 of the swing frame 106 so as to tightly hold the latter downwardly when in the position shown in Fig. IX. However, it is to be understood that said clamping lever 114 may be swung outwardly upon its pivot 115 to permit the cradle to be opened by said handle 112 which projects from the swing frame 103 as shown in Fig. V.

As shown in Figs. V, VI, IX, X, XVII and XVIII; the split ring cradle frame comprising said members 92 and 106 supports an anchor ring 120, comprising two semicircular sections of hardened steel respectively mounted in the complementary frame members 92 and 106, as best shown in Fig. IX. As best shown in Fig. XVII; said anchor ring 120 has a cylindrical flange with rounded edges projecting toward the right as indicated at 121, so as to immediately encircle and hold, in opposition to the spinning head 124, the right hand end of each such shell blank 75 thus fitted in said cradle.

As shown in detail in Figs. XV, XVI and XVII; said spinning head 124 carries a circumferential series of three forming rollers 125, mounted to rotate upon respective studs 126, held stationary in said head by respective set screws 127. Each of said forming rollers 125 has a circumferential groove 128 presented in opposition to said flange 121 on the anchor ring 120, as best shown in Fig. XVII, in axial alinement with the shell blank 75. Said rollers 125 first expand the right hand end of said shell 75, to the flared form shown in full lines in Fig. XVIII and, thereafter bend it over said flange 121 to the toric flanged form indicated in dotted lines at 129 in Fig. XVIII.

The right hand edge of each such shell blank 75 being thus expanded and bent over said anchor ring flange 121, to the toric form 129 shown in dotted lines in Fig. XVIII, by the rotary spinning head 124 and its appurtenances; each such blank 75 is thus successively anchored at its right hand end, by its overlapping engagement with said cylindrical flange 121 on said anchor ring 120; so that the metal of said shell is under tension from its right hand end toward its left hand end while it is being expanded by said die 76; drawn in that direction through said shell, as above described with reference to Fig. XVII.

I also find it desirable to provide said spinning head 124 with a series of three sizing rollers, 130, respectively mounted to rotate on the stationary studs 131, with their axes parallel with the axis of rotation of said head 124 and so spaced as to roll upon the inner cylindrical surface of said blank 75 immediately adjoining each of said flange forming rollers 125, to prevent the operation of the latter from deforming said shell inwardly. However, such rollers 130 are not essential to the proper operation of said forming rollers 125 which are capable of forming the toric flange 129 without internal deformation of said shell 75 if pressed toward said shell 75 at the proper rate.

As shown in Figs. XVI and XVII; said rotary spining head 124 is rigidly connected with the rotary shaft 132, conveniently by the key 133, axial bolt 134, nuts 135 and washer 136. As shown in Figs. III and IV; said shaft 132 is connected at its right hand end, by the coupling 138, with the plunger 139 which is mounted for reciprocation, without rotation, in the stationary cylinder 140. As shown in Figs. III and IV; said cylinder 140 is supported upon the pair of parallel girders 141 set on three foundation piers 142 and is tied to said girders 15 and 16 by the pair of parallel tie rods 143 which extend from said cylinder in engagement with the cross bar 144 which is rigidly secured to said girders 15 and 16 over the foundation pier 51.

Said coupling 138 includes an antifriction thrust bearing permitting said shaft 132 to be rotated therein while being thrust to the left by said non-rotatable plunger 139, and the movement of the latter is effected by hydraulic or other fluid pressure in said cylinder 140, controlled by any suitable means such as the valves 145 and 146 in the respective pipes 147 and 148 shown in Fig. III.

As shown in Figs. III and IV, said shaft 132 is mounted to rotate in the bearings 152 on the housing 153 which extends over said foundation pier 51 in rigid connection with said girders 15 and 16. Said shaft 132 is rotated by the electric motor 155, shown in Fig. III, having its armature shaft 156 provided with the worm 157 engaging the worm gear 158 which is sildably keyed on said shaft 132 between said bearings 152. Said shaft 132, which is thus arranged to rotate and reciprocate said rotary spinning head 124, is also journaled, immediately adjacent to said head, in the adjustable bearing 159 which is adjustably mounted in the carriage 160 provided with the supporting wheels 161 adapted to traverse the top flanges of said girders 15 and 16 as tracks. Said bearing 159 is adjustable to precisely determine that said head 124 shall rotate in coaxial relation with the shell blanks 75 while spinning the right hand ends of the latter as above described.

The mechanism above described may be conveniently operated as follows: Said rotary spinning head and the parts connected therewith being in the retracted position shown in Figs. III and IV; said electric motor 1, shown in Figs. I and II, is energized to slowly progress the chain 19 in the direction of the arrow shown in Fig. II, while the hooks 31 are engaged with said chain, until the hook frame 32, having reached the left hand limit of its range of movement, is tripped by its cam 39 encountering the stationary cam 40 and thus raises said hooks 31 from said chain, which may continue to move, idly, thereafter, until again reengaged by said hooks, as hereinafter described. Such traverse of the hook frame 32 and the carriage 35 connected therewith brings the expanding die 76 beyond the left hand end position for the shell blanks 75. Thereupon, said clamping lever 114, shown in Figs. V and IX, is turned outwardly to release the swing top of the cradle and the latter opened by the handle 112 shown in Fig. V, by simultaneously turning said swing frames 103 and 106 toward the front of the machine; thus affording access to said die 76. The wedge 82, shown in Figs. VI and XVII, which normally retains said die 76 upon its plunger 77, being then removed from the slot 83 in said plunger; said die 76 is bodily removed from said plunger and withdrawn from said cradle to permit a shell blank 75 to be laid in said cradle, with its left hand end abutting against the abutment blocks 66 as shown in Fig. XII, and with its right hand end slightly overhanging said anchor ring 120, as shown in Fig. XVII. Thereupon, the upper swing portion of said cradle is returned, by said handle 112, to the position shown in the drawings; in which position the cradle is clamped by returning said clamping lever 114 upwardly to the position shown in Fig. IX. Thereupon, said carriage 35, and the die plunger 77 connected therewith by the tension rods 79, are drawn toward the right until said plunger projects beyond the blank 75 far enough to permit said die 76 to be replaced thereon and secured by said wedge 82. Thereupon, said hook frame 32 is tilted by the handle 37 to reengage the hooks 31 with said chain 19 which proceeds to draw said shell expanding die 76 into the shell 75. When the right hand end of said shell blank 75 is thus expanded and frictionally held by engagement with the peripheral ring 86 of said die 76, as shown in Fig. XVII; said electric motor 155 is energized to rotate the spinning head 124 by its shaft 132, and the valves 145 and 146, shown in Fig. III, are manipulated to force said plunger 139 toward the left in Figs. III and IV, to present the rotating head 124 in the position shown in Fig. XVII and press it toward the left until the right hand edge of said blank 75 is expanded and bent over the cylindrical flange 121 on said anchor ring 120, as indicated in dotted lines in Fig. XVIII, thus anchoring said shell so that the continued movement of said shell expanding die 76 toward the left tensilely strains the metal of said shell blank toward the left.

Said shell blank 75 being thus supported at both ends during the double operation of expanding and spinning it; the left hand end being supported by said abutment blocks 66 and the right hand end by said anchor ring; said two operations continue contemporaneously until said peripheral ring 86 of said die 76 having encountered said abutment blocks 66 thrusts them simultaneously radially outward, by its passage between them, and thus completes the expansion of said shell to the extreme left end of the latter. It may be observed that if said shell 75 were merely expanded transversely, it would be shortened so that its left-hand end originally brought in contact with said abutments 66 would recede therefrom toward the right, as the die 76 progressed through the shell toward the left. However, with the die properly proportioned in diameter to the diameter of the shell, the metal of the shell is not only caused to flow from the smaller to the larger diameter, but is stretched longitudinally to the predetermined limit established by the abutments 66, and the product is not only smoothly cylindrical throughout its length, but of the length predetermined by the location of said abutments with reference to the anchoring ring 120. Such operation is, of course, dependent upon the precisely determined relative sizes of the unworked shell and the die which is used to work it. For instance, if the die is too large in diameter for the operation which it is designed to perform, the effect is to stretch the shell longitudinally between said anchoring ring and the die, to such a degree that the portion of the shell between the die and said abutments 66 is compressed and crumpled against said abutments.

Thereupon said valves 145 and 146 controlling the pressure in said cylinder 140, are manipulated to stop the traverse of said spinning head 124 to the left, and cause it to traverse to the right to its initial position shown in Figs. III and IV. During such reversal; the motor 155, which was energized to rotate said head 124 by its shaft 132, may be stopped.

Thereupon, said shell 75 which has thus been expanded to uniform diameter throughout its length and provided with the toric flange indicated at 129 in Fig. XVII, may be withdrawn toward the right, to release its toric flange from said anchor ring 120 in order that the cradle may be opened, and also so far that the left hand end of said shell is clear of the throat frame 61 shown in Fig. XII. Thereupon, said cradle clamping lever 114 may be turned outwardly from the position shown in Figs. V and IX to release the upper swing portion of said cradle, so that the latter may be again opened, by the handle 112 shown in Fig. V, so that said shell may be lifted from said cradle and another shell blank 75 be placed in said cradle and the operation repeated as above described.

The embodiment of my invention herein illustrated is designed for operation upon standard fourteen-inch diameter munition casings of the United States Government. Consequently, there are various details of construction and arrangement which are incident to that purpose but are not of the essence of my invention. Moreover, I desire to broadly claim the method of forming straight shells, by the simultaneous production of the two effects, of expanding a shell blank transversely while stressing it longitudinally, beyond the elastic limits of the material of the blank; without limitation to the specific construction and arrangement of any mechanism whereby such operations are thus cooperatively performed.

Therefore, I do not desire to limit myself to the precise details of construction and arrangement herein set forth, as it is obvious that various modifications may be made therein, without departing from the essential features of my invention, as defined in the appended claims.

I claim:

1. In shell forming mechanism, the combination with means arranged to temporarily hold a shell blank in stationary position, including two semicylindrical hingedly connected cradle frames, arranged to embrace said blank, and an annular abutment comprising a circumferential series of radially movable abutment blocks, at one end of said cradle, arranged to abut one end of said blank and prevent its axial movement; of an anchor ring, encircling said blank at the other end of said cradle; means arranged to uniformly expand said blank, throughout its length, in said cradle, against said abutment, including a circular die, having its front end smaller in diameter than said blank, and having a toric zone larger in diameter than said blank; means arranged to temporarily support said die in coaxial relation with said blank, including an axial reciprocatory plunger, and means arranged to detachably connect said die with said plunger; means arranged to draw said die through said blank, including a carriage connected with said plunger, a cross head on said plunger and a pair of tension rods extending from said cross head to said carriage; a hook pivoted on said carriage; an endless chain arranged to be intermittently engaged by said hook; means arranged to progress said chain; means arranged to temporarily anchor one end of said blank to said anchor ring by flaring that end of said blank over said ring; including a rotary spinning head, carrying a circumferential series of torically grooved rollers, each mounted to rotate on an axis radial to the axis of said head; means arranged to support said head in coaxial relation with said blank, including a rotary shaft and a nonrotary plunger, alined in coaxial relation with said blank; means arranged to reciprocate both said plunger and shaft, by fluid pressure, including a cylinder in which said nonrotary plunger extends; and means arranged to rotate said shaft; including a worm gear through which said shaft is slidable and to which it is keyed, a worm engaged with said gear, and means arranged to rotate said worm; whereby, said blank may be contemporaneously expanded by said die, spun into toric flanged form at one end, by said rollers, and tensilely stressed in the direction of the axial movement of said die in said blank.

2. In shell forming mechanism, the combination with means arranged to temporarily hold a shell blank in stationary position, including a cradle arranged to embrace said blank, and an annular abutment, comprising a circumferential series of radially movable abutment blocks, at one end of said cradle, arranged to abut one end of said blank and prevent its axial movement; of an anchor ring, encircling said blank at the other end of said cradle; means arranged to uniformly expand said blank, throughout its length, in said cradle, against said abutment, including a circular die, having its front end smaller in diameter than said blank, and having a zone larger in diameter than said blank; means arranged to temporarily support said die in coaxial relation with said blank, including an axial reciprocatory plunger, and means arranged to detachably connect said die with said plunger; means arranged to draw said die through said blank, including a carriage connected with said plunger; a hook pivoted on said carriage; an endless chain arranged to be intermittently engaged by said hook; means arranged to progress said chain; means arranged to temporarily anchor one end of said blank to said anchor ring by flaring that end of said blank over said ring; including a rotary spinning head, carrying a series of rollers, each mounted to rotate on an axis radial to the axis of said head; means arranged to support said head in coaxial relation with said blank, including a rotary shaft and a nonrotary plunger, alined in coaxial relation with said blank; means arranged to reciprocate both said plunger and shaft, by fluid pressure upon said nonrotary plunger, and means arranged to rotate said shaft; whereby, said blank may be contemporaneously expanded by said die, spun into flanged form at one end, by said rollers, and tensilely stressed in the direction of the axial movement of said die in said blank.

3. In shell forming mechanism, the combination with means arranged to temporarily hold a shell blank in stationary position, including a cradle for said blank, and an annular abutment at one end of said cradle, arranged to abut one end of said blank and prevent its axial movement; of an anchor ring, encircling said blank at the other end of said cradle; means arranged to uniformly expand said blank, throughout its length, in said cradle, against said abutment, including a circular die; means arranged to temporarily support said die in coaxial relation with said blank; means arranged to draw said die through said blank, including a carriage connected with said die; a hook pivoted on said carriage; an endless chain arranged to be intermittently engaged by said hook; means arranged to progress said chain; means arranged to temporarily anchor one end of said blank to said anchor ring by flaring that end of said blank over said ring, including a rotary spinning head, carrying rollers; means arranged to support said head in coaxial relation with said blank, including a rotary shaft; means arranged to reciprocate said shaft; and means arranged to rotate said shaft; whereby, said blank may be contemporaneously expanded by said die, spun into flanged form at one end, by said rollers, and tensilely stressed in the direction of the axial movement of said die in said blank.

4. In shell forming mechanism, the combination with means arranged to temporarily hold a shell blank in stationary position, including means arranged to embrace said blank, and an abutment, arranged to abut one end of said blank and prevent its axial movement; of an anchor ring, encircling said blank at its other end; means arranged to uniformly expand said blank, throughout its length, against said abutment, including a circular die; means arranged to temporarily support said die in coaxial relation with said blank; means arranged to draw said die through said blank, including a carriage connected with said die; a hook pivoted on said carriage; an endless chain arranged to be intermittently engaged by said hook; means arranged to progress said chain; means arranged to temporarily anchor one end of said blank to said anchor ring, including a rotary spinning head; means arranged to support said head in coaxial relation with said blank, including a rotary shaft; means arranged to reciprocate said shaft; and means arranged to rotate said shaft; whereby, said blank may be contemporaneously expanded by said die, spun into flanged form at one end, and tensilely stressed in the direction of the axial movement of said die in said blank.

5. In shell forming mechanism, the combination with means arranged to temporarily hold a shell blank in stationary position; of an anchor ring, encircling said blank at one end; means arranged to uniformly expand said blank, throughout its length, including a die; means arranged to draw said die through said blank, including a carriage connected with said die; an endless chain arranged to be intermittently engaged with said carriage; means arranged to progress said chain; means arranged to temporarily anchor one end of said blank to said anchor ring by flaring that end of said blank over said ring, including a rotary spinning head; means arranged to support said head, including a rotary shaft; means arranged to reciprocate said shaft; and means arranged to rotate said shaft; whereby, said blank may be contemporaneously expanded by said die, spun into flanged form at one end, by said head, and tensilely stressed in the direction of the axial movement of said die in said blank.

6. In shell forming mechanism, the combination with means arranged to temporarily hold a shell blank in stationary position, including a cradle for said blank, and an annular abutment, comprising a circumferential series of outwardly radially movable abutment blocks, at one end of said cradle, arranged to abut one end of said blank and prevent its axial movement; of individual springs pressing said blocks inwardly; means arranged to uniformly expand said blank, throughout its length, in said cradle, against said abutment, including a circular die, having its front end smaller in diameter than said blank, and having a zone larger in diameter than said blank; said die capable of thrusting said blocks outwardly, when drawn between them; means arranged to temporarily support said die in coaxial relation with said blank, including an axial reciprocatory plunger, and means arranged to detachably connect said die with said plunger; means arranged to draw said die through said blank and abutment, including a carriage connected with said plunger; a hook pivoted on said carriage; an endless chain arranged to be intermittently engaged by said hook; and means arranged to progress said chain.

7. In shell forming mechanism, the combination with means arranged to temporarily hold a shell blank in stationary position, including a cradle for said blank, and an annular abutment, comprising a circumferential series of outwardly radially movable abutment blocks, at one end of said cradle, arranged to abut one end of said blank and prevent its axial movement; of spring means pressing said blocks inwardly; means arranged to uniformly expand said blank, throughout its length, in said cradle, against said abutment, including a circular die, having its front end smaller in diameter than said blank, and having a zone larger in diameter than said blank; said die capable of thrusting said blocks outwardly, when drawn between them; means arranged to draw said die through said blank and abutment, including a carriage detachably connected with said die; a hook on said carriage; an endless chain arranged to be intermittently engaged by said hook; and means arranged to progress said chain.

8. In shell forming mechanism, the combination with means arranged to temporarily hold a shell blank in stationary position, including a cradle for said blank, and an annular abutment, comprising a circumferential series of outwardly radially movable abutment blocks, at one end of said cradle, arranged to abut one end of said blank and prevent its axial movement; of spring means pressing said blocks inwardly; means arranged to uniformly expand said blank, throughout its length, in said cradle, against said abutment, including a circular die, having its front end smaller in diameter than said blank, and having a zone larger in diameter than said blank; said die capable of thrusting said blocks outwardly, when drawn between them; and means arranged to draw said die through said blank and abutment.

9. In shell forming mechanism, the combination with means arranged to temporarily hold a shell blank in stationary position, including an annular abutment, comprising a circumferential series of outwardly radially movable abutment blocks, arranged to abut one end of said blank and prevent its axial movement; of spring means pressing said blocks inwardly; means arranged to uniformly expand said blank, throughout its length, in said cradle, against said abutment, including a circular die, having its front end smaller in diameter than said blank, and having a zone larger in diameter than said blank; said die capable of thrusting said blocks outwardly, when drawn between them; and means arranged to draw said die through said blank and abutment.

10. In shell forming mechanism, the combination with means arranged to temporarily hold a shell blank in stationary position, including an abutment, comprising a series of movable abutment blocks, arranged to abut one end of said blank and prevent its axial movement; of means arranged to thrust said blank against said abutment, including a die, having its front end smaller in diameter than said blank; said die capable of moving said blocks outwardly, when drawn between them; and means arranged to draw said die through said blank and abutment.

11. In shell forming mechanism, the combination with means arranged to temporarily hold a shell blank in stationary position; of an anchor ring, encircling said blank at one end; a die; means arranged to draw said die through said blank; means arranged to temporarily anchor one end of said blank to said anchor ring by flaring that end of said blank over said ring, including a rotary spinning head, carrying rollers; means arranged to support said head in coaxial relation with said blank, including a rotary shaft; means arranged to reciprocate said shaft; and means arranged to rotate said shaft.

12. In shell forming mechanism, the combination with means arranged to temporarily hold a shell blank in stationary position; of means arranged to expand said blank, including a circular die; means arranged to temporarily support said die in coaxial relation with said blank, including a reciprocatory plunger, carried by a cross head supported by a pair of rods; means arranged to draw said die through said blank, including a carriage pivotally connected with said rods; a hook pivoted on said carriage; an endless chain arranged to be intermittently engaged by said hook; and means arranged to progress said chain.

13. In shell forming mechanism, the combination with means arranged to temporarily hold a shell blank in stationary position; of means arranged to expand said blank, including a die; means arranged to temporarily support said die in coaxial relation with said blank, including a reciprocatory plunger; means arranged to draw said die through said blank, including a carriage connected with said plunger; a hook pivoted on said carriage; an endless chain arranged to be intermittently engaged by said hook; and means arranged to progress said chain.

14. In shell forming mechanism, the combination with means arranged to temporarily hold a shell blank in stationary position; of a die; means arranged to draw said die through said blank, including a carriage connected with said die; a hook on said carriage; an endless chain arranged to be intermittently engaged by said hook; and means arranged to progress said chain.

15. In shell forming mechanism, the combination with means arranged to temporarily hold a shell blank in stationary position; of a die; means arranged to draw said die through said blank, including a carriage connected with said die; a hook on said carriage; an endless chain arranged to be engaged by said hook; means arranged to progress said chain; and means arranged to automatically disengage said hook from said chain, operative by the movement of said carriage.

16. In shell forming mechanism, the combination with means arranged to temporarily hold a shell blank in stationary position; of a die; means arranged to temporarily support said die in coaxial relation with said blank, including an axially reciprocatory plunger, having a slot, and a wedge extending transversely to said plunger in said slot engaging said die; means arranged to draw said die through said blank; and means arranged to intermittently connect said drawing means with said plunger.

17. In shell forming mechanism, the combination with means arranged to temporarily hold a shell blank in stationary position; of a rotary spinning head, carrying a circumferential series of torically grooved rollers; each mounted to rotate on an axis radial to the axis of said head; means arranged to support said head in coaxial relation with said blank, including a rotary shaft and a nonrotary plunger, alined in coaxial relation with said blank; means arranged to reciprocate said plunger and shaft, by fluid pressure, including a cylinder in which said nonrotary plunger extends; and means arranged to rotate said shaft, including a worm gear through which said shaft is slidable and to which it is keyed, a worm engaged with said gear, and means arranged to rotate said worm; whereby, said blank may be spun into toric flanged form, at one end, by said rollers.

18. The combination with means arranged to temporarily hold a circular tubular shell, including an abutment at one end thereof; of an anchor ring encircling the other end of said shell; spinning means arranged to flange the latter end of said shell outwardly over said ring; and means arranged to simultaneously expand said shell transversely and tensilely stress it longitudinally, including a circular die and means arranged to progress said die in said shell from the flanged end toward the other end of said shell.

19. The combination with means arranged to temporarily hold a tubular shell, including a ring encircling one end thereof; of means arranged to flange that end of said shell outwardly over said ring; and means arranged to simultaneously expand said shell transversely and tensilely stress it longitudinally, including a die, and means arranged to progress said die in said shell from the flanged end toward the other end of said shell.

20. The method of forming a straight cylindrical tubular metal shell, which consists in temporarily holding a shell blank, at one end, while simultaneously expanding it transversely and tensilely stressing it longitudinally beyond the elastic limits of its metal, by progressing a circular die in it from its held end toward its other end.

21. The method of forming a straight tubular metal shell, which consists in temporarily holding a shell blank, at one end, while simultaneously expanding it transversely and tensilely stressing it longitudinally beyond the elastic limits of its metal, by progressing a die in it from its held end toward its other end.

In testimony whereof, I have hereunto signed my name at Conshohocken, Pennsylvania, this second day of May, 1921.

VICTOR MAUCK.

Witnesses:
MORRIS H. FELDEVER,
FRANK SUTCLIFFE.